United States Patent [19]

Weimer

[11] 4,237,477
[45] Dec. 2, 1980

[54] CHARGE TRANSFER IMAGER

[75] Inventor: Paul K. Weimer, Princeton, N.J.

[73] Assignee: RCA Corporation, New York, N.Y.

[21] Appl. No.: 87,454

[22] Filed: Oct. 22, 1979

[51] Int. Cl.³ .............................................. H04N 9/07
[52] U.S. Cl. ..................................................... 358/44
[58] Field of Search ......................... 358/41, 43, 44, 48

[56] References Cited

U.S. PATENT DOCUMENTS

| 4,016,598 | 4/1977 | Yamanaka | 358/41 |
| 4,080,622 | 3/1978 | Sugihara | 358/44 |
| 4,179,706 | 12/1979 | Nishimura | 358/44 |

FOREIGN PATENT DOCUMENTS 2001504  1/1979  United Kingdom ....................... 358/44

OTHER PUBLICATIONS

Koike, et al., "An NPN Structure 484×384 MOS Imager for a Single-Chip Color Camera", IEEE International Solid-State Circuits Conference, Feb. 15, 1979, pp. 192-193.

Primary Examiner—Howard W. Britton
Assistant Examiner—Michael A. Masinick
Attorney, Agent, or Firm—Samuel Cohen; George J. Seligsohn

[57] ABSTRACT

Single-chip, color imager in which filters for the three colors are arranged in successive stripes over the rows. The rows are read out a pair at a time. Each line of displayed information is obtained by combining the signals read from the last row of one pair of rows, delayed one horizontal line time, with the signals read from the following pair of rows.

3 Claims, 1 Drawing Figure

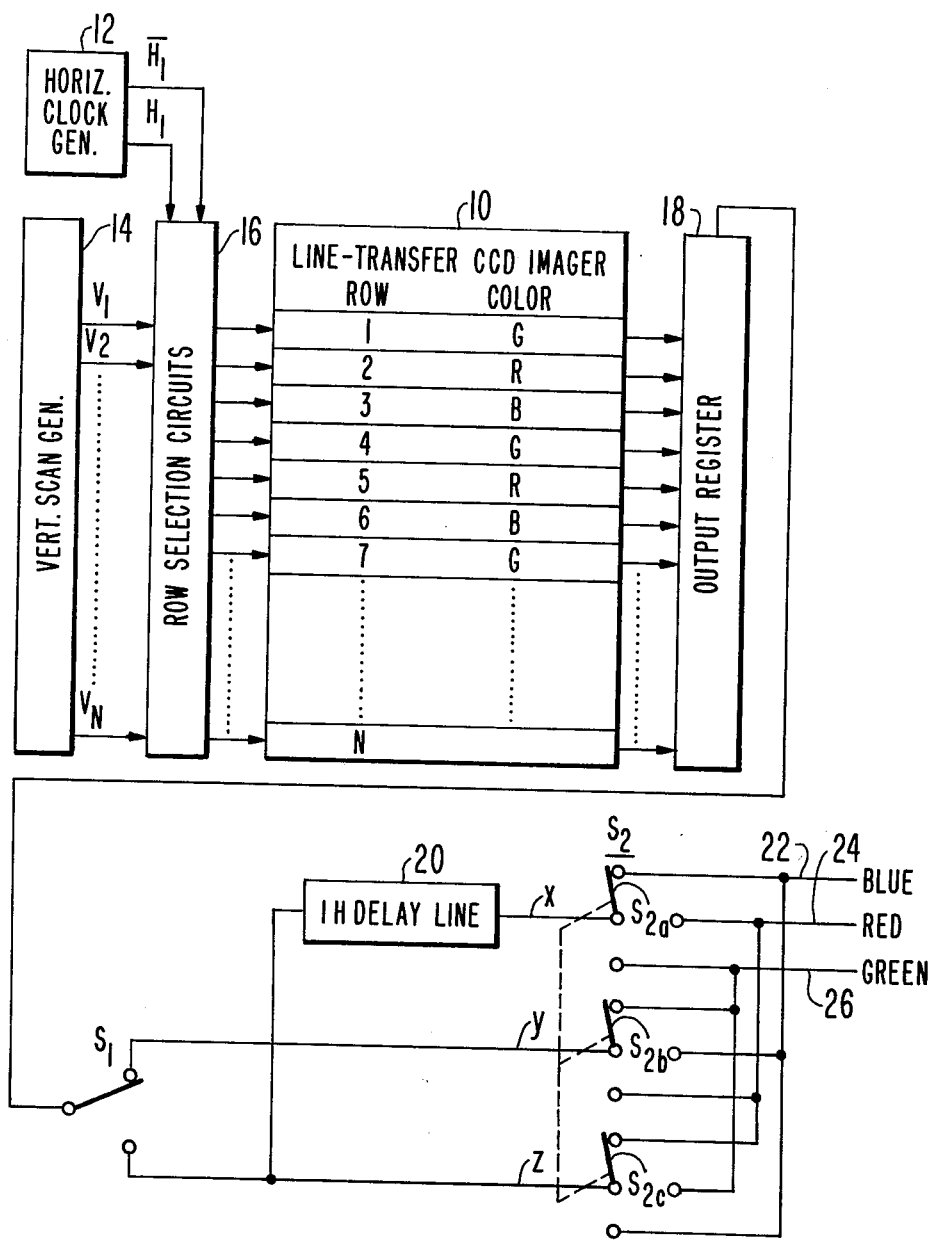

CHARGE TRANSFER IMAGER

The present invention relates to a charge-transfer (CT) color imager such as one of the charge-coupled device (CCD) type.

Copending application Ser. No. 005,073 for "Line Transfer CCD Imagers," filed Jan. 22, 1979 by the present inventor and assigned to the same assignee as the present application, describes horizontal transfer line scan CCD imagers suitable for color. These imagers are read out one, or two, or three rows at a time. In the embodiment of FIG. 15 in which filters for three colors are arranged in successive stripes over the rows, a simultaneous three-color signal is produced directly by scanning three rows at a time. Assuming the display is desired to have at least 240 lines, such as sensor requires 3×240 or 720 rows per field. An imager this large would be relatively costly to manufacture and therefore, as a practical matter, would not be suitable for a low-cost imager at the present state of the art.

Other embodiments of the invention described in the copending application are operated by scanning two rows at a time. With the same assumption as above, namely 240 lines in the display, this requires only 480 rows per field. In addition to being of lower cost, this imager has the advantage that adjacent rows can be paired differently in successive fields to provide standard vertical interlace. Various methods of channeling the signals from the two rows into two separate outputs or interleaving them into a single output register operating at twice the horizontal frequency are described in the copending application. In embodiments of the invention described in the copending application in which the signals are read out two rows at a time, signals are derived from the sequential color signals in the two rows by sampling the signals in the two rows and effectively delaying those in one of the rows relative to those in the other by approximately one element time. Such systems, although simple to operate, have the disadvantage that the horizontal resolution is reduced by the need for stretching each elemental signal (three color components make up such a signal) to obtain simultaneous overlap with freedom from repetitive patterns in regions of large area primary colors. In such systems as, for example, is illustrated in FIG. 8 of the copending application, the use of each row for more than one color means that any transfer loss or blooming in one color will tend to cause charge to spill into an adjacent substrate region having a different color and this makes the spurious signal more conspicuous. Further, a color filter such as illustrated in FIG. 8 in which adjacent color elements in the row are different, is more difficult to fabricate and to register with the image sensor locations than would be the case with a stripe filter.

In an imager embodying the present invention, the filters for three colors are arranged in successive stripes over the rows. The rows are read out a pair of rows at a time. Each line of displayed information is obtained by combining the signals read from the last row of one pair of rows, delayed one horizontal line time, with the signals read from the following pair of rows.

In the drawing:

The sole FIGURE is a block diagram of a system embodying the invention.

Referring to the drawing, the line transfer CCD imager 10 comprises a plurality of horizontal rows of CCD elements numbered 1, 2 . . . N, with successive rows in the three different colors such as green, red and blue. It is to be understood that these colors are intended to be representative only, as other color stripes could be used instead. The imager 10 is read out in the same way as the ones described in the copending application which are read out two rows at a time. The readout circuits include horizontal clock generator 12, a vertical scan generator 14 and row selections circuits 16. These correspond to circuits such as shown in FIG. 4 of the copending application at the left of the FIGURE. The output register 8 also can correspond in structure and operation to the output register of FIG. 4 of the copending application.

The serial output of the output register 18 is applied through a switch $S_1$, operated at the output register clocking frequency, to two conductors y and z and through a 1H (one horizontal line time) delay line 20 to a third conductor x. The three conductors are connected via ganged switch $S_2$ to three output lines 22, 24 and 26 for the blue, red and green signals, respectively.

In the operation of the system shown in the drawing, the horizontal clock generator 12 and vertical scan generator 14 are operated in the same way as described in the copending application to obtain the simultaneous readout of a pair of rows at a time. To obtain the odd field, for example, first rows 1 and 2 are read out simultaneously. The structure of the imager is such, as described in the copending application, that the signals in the two rows 1 and 2 are interleaved in the output register 18, which output register is operated at a frequency twice that of the horizontal clock generator 12. Thus, the output signal produced by the output register consists of a green signal from row 1 followed by a red signal from row 2 followed by a green signal from row 1 followed by a red signal from row 2, and so on. Switch $S_1$ is operated at the same frequency as the output register and in synchronism therewith. Thus, during a first instant of time, call it $t_0$, a green signal from row 1 appear on conductor y and thereafter switch $S_1$ will move from conductor y to conductor z so that the following signal (a red signal from row 2) will appear on conductor z and will also be applied to the 1H delay line 20. During the third interval of time, call it $t_2$, switch $S_1$ will switch back to conductor y and the third signal (a G signal from row 1) will be applied to conductor y.

The process above continues until the entire contents of rows 1 and 2 have been scanned out. During this entire line time, the switch $S_2$ is in the position shown. In this position the switch element $S_{2b}$ connects conductor y to output line 26 for the green color and switch $S_{2c}$ connects conductor z to output line 24 for the red color. Thus, green and red color signals appear simultaneously on these lines, as required. These two signals are supplied to circuits (not shown) which employ them for scanning the first line (line 1) of the odd field of a display (not shown) such as a kinescope.

During the next horizontal line period, rows 3 and 4 are scanned. The signals produced by the output register in response to the scanning of rows 3 and 4 are applied via switch $S_1$ in a manner similar to that described above. The blue signals from row 3 will be applied to conductor y and the green signals from row 4 will be applied to conductor z and to 1H delay line 20. During this period the output of the 1H delay line which consists of red signals from the previously scanned row 2 will appear on conductor x. Further, after the scanning of the first pair of rows, the switch $S_2$ is thrown to the next position so that element $S_{2a}$ connects to conductor 24, element S$_{2b}$ to conductor 22 and element S$_{2c}$ to conductor 26. Thus, the red signals on conductor x (from row 2) are applied through switch S$_2$ to the red signal conductor 24, the blue signals on conductor y (from row 3) are applied through switch element S$_{2b}$ to the blue signal conductor 22 and the green signals on conductor z (from row 4) are applied through switch element S$_{2c}$ to the green signal conductor 26. These three signals subsequently are combined to produce line 3 of the odd field.

The process above continues until the entire odd field has been read from the imager 10. The table below illustrates how the first three lines 1, 3 and 5 of the odd field are produced. In the table, M indicates the rightmost charge storage location along a row; M-1 indicates the next location to the left and so on. The successive combined signals are not shown; however, in line 1 they would be GR, GR . . . , in line 3 RBG, RBG . . . , and in line 5 GRB, GRB . . . .

ODD FIELD

LINE 1

| | M | M-1 | M-2 | |
|---|---|---|---|---|
| x | | | | |
| y | G | G | G | (row 1) |
| z | R | R | R | (row 2) |

LINE 3

| | M | M-1 | M-2 | |
|---|---|---|---|---|
| x | R | R | R | (1H delayed row 2) |
| y | B | B | B | (row 3) |
| z | G | G | G | (row 4) |

LINE 5

| | M | M-1 | M-2 | |
|---|---|---|---|---|
| x | G | G | G | (1H delayed row 4) |
| y | R | R | R | (row 5) |
| z | B | B | B | (row 6) |

After the odd field is read out in the manner described above, the even field is read out. The first two rows are 2 and 3 and they become part of line 2 of the display. Assuming that at the time these two rows 2 and 3 are being supplied from the output register there is already stored in the 1H delay line the green signals from row 1 which were read out during a previous line scan for a single row, then signals produced on conductors x, y and z will be G, R and B, respectively. These signals will be applied through the switch S$_2$, the elements of which will be in the furthest down position to the green, red and blue output signal conductors 26, 24 and 22, respectively. The remainder of the operation is very similar to that which already has been discussed and is further illustrated in the table below.

EVEN FIELD

LINE 2

| | M | M-1 | M-2 | |
|---|---|---|---|---|
| x | G | G | G | (1H delayed row 1) |
| y | R | R | R | (row 2) |
| z | B | B | B | (row 3) |

LINE 4

| | M | M-1 | M-2 | |
|---|---|---|---|---|
| x | B | B | B | (1H delayed row 3) |
| y | G | G | G | (row 4) |
| z | R | R | R | (row 5) |

LINE 6

| | M | M-1 | M-2 | |
|---|---|---|---|---|
| x | R | R | R | (1H delayed row 5) |
| y | B | B | B | (row 6) |
| z | G | G | G | (row 7) |

Some advantages of the system are that each filter stripe is continuous along each row and introduces no pattern which could limit horizontal resolution or in the case of commercial television, which would interfere with subsequent NTSC signal processing. Each horizontal row in the register is dedicated to only one color so that color mixing due to charge transfer in the imager is avoided. Color mixing in the output register is easily avoided by making the potential well capacity larger in the output register than in the rows. Advantageously, the output register is a buried channel register to provide very low transfer losses.

While in the present system horizontal resolution is improved as compared to the imager of the copending application with different colors along each row, the vertical resolution of the present imager for color detail is reduced relative to the previous imager. In the present system the spot size has increased from two rows to three rows in the vertical direction with one row overlapped in each field. However, the center-to-center spacing of successive television lines in the two systems remains the same. It is expected that the present system will yield smooth signals for large area primary colors. The overall performance of the system is expected to be high for the reasons given.

The horizontal resolution and color purity should be high because of the absence of color filter stripes in the horizontal direction, and the vertical resolution is degraded only slightly by the increase in vertical spot size from two to three row widths. Image break-up due to the 1H delay line would be visible only with very rapid motion in the scene.

The illustration of the present system is schematic. In practice, the switches S$_1$ and S$_2$ will be electronic switches such as field effect transistors. The 1H delay line 20 preferably is a CCD delay line clocked at the same frequency as the imager. In embodiments in which the line-scan CCD sensor provides simultaneous output signals from two adjacent rows (as in FIG. 15 of the copending application) the switch S$_1$ is used only to select the proper signal on successive fields to be fed into the 1H delay line.

While illustrated as a horizontal line scan imager, the proposed color system is applicable to any color sensor having stripe filters arranged in horizontal rows and which permits separable output signals to be derived from adjacent pairs of rows. These include frame transfer CCD sensors with double output registers as well as xy addressed sensors of the CID and MOS-photodiode variety. It may even be used with camera tubes provided the electron beam can be made to follow the proper pair of color stripes.

What is claimed is:

1. A charge-transfer (CT) color imager comprising, in combination:

a CT imager array arranged in a plurality of rows;

color filter stripes over the rows, each stripe over a row being of the same color over the entire length of a row, and the stripes over each group of three adjacent rows being in three different colors;

means for reading out the rows of the imager, a pair of rows at a time;

means for delaying for one line time, the signals read from the last row of each pair of rows read out; and means for selecting color signals to be combined comprising, means for producing, during each of successive intervals in each line time, signals read from successive locations along the pair of rows then being read out, and the signals delayed one line time read from corresponding locations of the preceding row of the pair of rows read out during the previous line time.

2. A CT imager as set forth in claim 1 wherein each group of three filter stripes comprises green, red and blue stripes, respectively.

3. A CT imager as set forth in claim 1 wherein the means for reading out a pair of rows at a time includes means for interleaving the signals read from the first row of each pair with those read from the second row of a pair, wherein the means for delaying comprises a delay line, and wherein the means for selecting comprises two conductors, first switch means for routing the interleaved signals in alternate fashion to (a) one of the conductors and (b) to the other of the conductors and the input to the delay line, and second switch means for routing the output signal of the delay line and the signals on the two conductors to three separate output terminals for the three different colors.

* * * * *